United States Patent [19]

Roberts et al.

[11] Patent Number: 5,710,672

[45] Date of Patent: Jan. 20, 1998

[54] ASSEMBLY FOR POSITIONING THE COMPONENT PARTS OF A LASER DETECTOR GRATING UNIT (LDGU)

[75] Inventors: David Anthony Roberts, Olney, Great Britain; John Charles Brazas, Jr., Hilton, N.Y.

[73] Assignee: Eastman Kodak Company, Rochester, N.Y.

[21] Appl. No.: 723,177

[22] Filed: Sep. 30, 1996

[51] Int. Cl.[6] .................................. G02B 7/02; G11B 7/00
[52] U.S. Cl. ................................ 359/819; 369/44.14
[58] Field of Search ............................. 359/819, 822, 359/823, 824; 369/44.12, 44.14, 44.22, 109, 112

[56] References Cited

U.S. PATENT DOCUMENTS

| | | | |
|---|---|---|---|
| 4,945,529 | 7/1990 | Ono et al. | 369/109 |
| 5,050,153 | 9/1991 | Lee | 369/112 |
| 5,406,541 | 4/1995 | Kay | 369/120 |
| 5,511,059 | 4/1996 | Brazas, Jr. | 369/109 |
| 5,544,143 | 8/1996 | Kay et al. | 369/109 |
| 5,608,708 | 3/1997 | Ophey | 369/109 |
| 5,617,403 | 4/1997 | Iizuka | 369/244 |

OTHER PUBLICATIONS

C. J. Leedecke et al, Electronics Materials Handbook, vol. 1, Packaging, 1989.
Alan B. Marchant, Optical Recording, 1990, pp. 172–179, Addison–Wesley Publishing Co.
W.Ophey, Compact Optical Light Paths, Jpn, J. Appl. Phys., vol. 32, Part 1, No. 118, Nov. 1993, pp. 5252–5257.

Primary Examiner—David C. Nelms
Assistant Examiner—Ricky Mack
Attorney, Agent, or Firm—Raymond L. Owens

[57] ABSTRACT

An optical system includes an LDGU having a grating beam splitter and an optical source with an effective aperture for generating a radiation beam to be applied to a data track of an optical storage medium, a detector array and a micro-lens. An LDGU mounting structure includes: a baseplate having a plurality of clearance holes and defining a registration groove; a plurality of contact pins which are aligned in the clearance holes of the baseplate; and a pedestal defining a plurality of surfaces for mounting the optical source, the detector array and the micro-lens. The mounting structure further includes: a cover including a transparent window fixedly secured to the baseplate to form a hermetic seal; and a grating support barrel for mounting the grating beam splitter which is aligned to the registration groove in the baseplate and which has an opening and a plurality of registration surfaces defined on its uppermost surface.

2 Claims, 2 Drawing Sheets

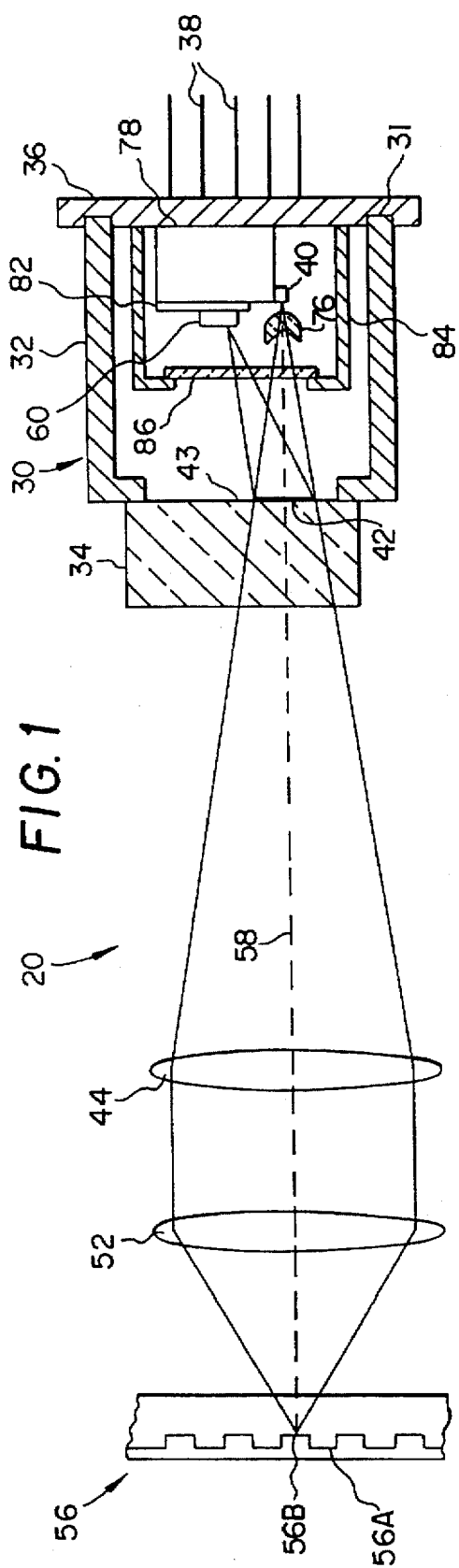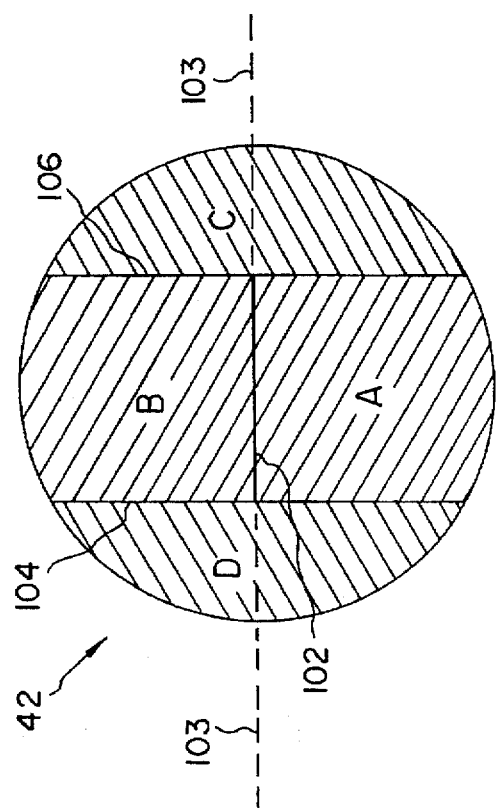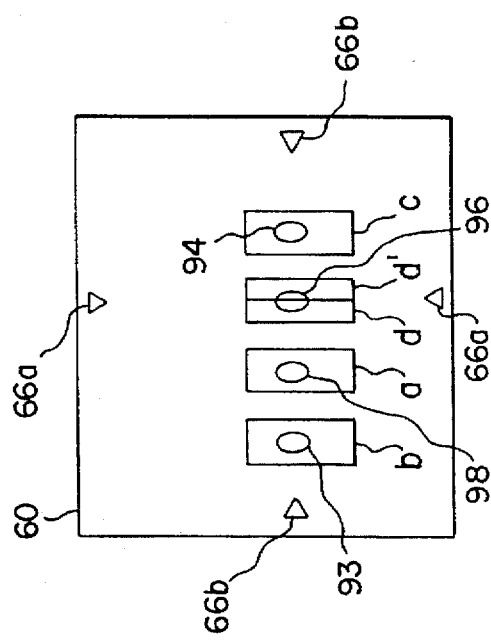

ASSEMBLY FOR POSITIONING THE COMPONENT PARTS OF A LASER DETECTOR GRATING UNIT (LDGU)

CROSS-REFERENCE TO RELATED APPLICATIONS

Reference is made to commonly-assigned U.S. patent application Ser. No. 08/671,852 filed Jun. 28, 1996 entitled "Multi-Element Grating Beam Splitter in an Optical Recording Device Providing Uniform Beam Splitting Efficiency"; commonly-assigned U.S. patent application Ser. No. 08/674,225 filed Jun. 28, 1996 entitled "Improved Beam Splitter for Optical Recording", and commonly-assigned U.S. patent application Ser. No. 08/693,033 filed Aug. 6, 1996, entitled "An Assembly Used for Precisely Positioning the Component Parts of a Laser Detector Grating Unit (LDGU), the disclosures of these related applications are incorporated herein by reference.

FIELD OF THE INVENTION

The present invention relates generally to optical read/write heads used in optical information storage and retrieval systems. More particularly, the present invention relates to positioning the component parts of a laser-detector-grating unit (LDGU).

BACKGROUND OF THE INVENTION

In many optical information storage and retrieval systems, a radiation beam from an optical source is reflected and diffracted from a data track on an optical storage medium. The beam returning from the storage medium may be directed to a detector array that provides signals used to generate, for example, a focus error signal (FES), a tracking error signal (TES) and a data signal. The FES and TES generally drive servo systems for maintaining the radiation beam in-focus and on-track, respectively, relative to the storage medium. The data signal is indicative of the data stored on the data track scanned by the radiation beam. The portion of the optical system which generates and processes the radiation beam is generally referred to as an optical head.

The stability of an optical head is usually improved by decreasing the distance between certain critical components, such as an optical source, beam splitter and detector array. In addition, the cost and complexity of the optical head is reduced if these components are integrated into a single package. A known technique for accomplishing these objectives involves combining components such as an optical source, a grating beam splitter and a detector array into an integrated package generally referred to as a laser-detector-grating unit (LDGU). LDGUs are also known as laser/detector optical heads and hologram laser units. Optical systems which incorporate an LDGU or a similar device will be referred to herein as LDGU-based systems. A number of exemplary LDGU-based systems are described in W. Ophey, "Compact Optical Light Paths," Jpn. J. Appl. Phys., Vol. 32, Part 1, No. 11B, pp. 5252–5257, Nov. 1993. Other LDGU-based systems are described in, for example, U.S. Pat. Nos. 5,050,153 and 4,945,529. An exemplary optical head in accordance with U.S. Pat. No. 4,945,529 includes a diffraction grating with four grating regions. The four grating regions direct portions of a reflected and diffracted radiation beam to a detector assembly in order to generate an FES, a TES and a data signal.

Existing LDGUs also typically have an inherently low throughput efficiency, due in part to the fact that the radiation beam is generally not circularized. A circularized radiation beam is rotationally symmetrical about its optical axis. Throughput efficiency may be defined in terms of a percentage of optical source radiation which is transferred to the surface of the optical storage medium. Currently available LDGUs used for reading optical discs have throughput efficiencies on the order of only about 10%, with a considerable amount of the optical source output lost in the grating beam splitter and in truncating the non-circularized radiation beam. Although LDGUs are now commonly used for read-only applications such as compact disc (CD) players, the problems of source noise and low throughput efficiency have limited the usefulness of LDGUs in higher power applications such as optical recording.

In addition, some LDGU designs exhibit excessive optical cross-talk between tracking and focus signals. The optical cross-talk originates from, for example, diffracted radiation components and optical wavefront aberrations in the return beam. The presence of optical cross-talk may limit the effectiveness of LDGUs in certain optical systems, particularly those systems which utilize high performance focus and tracking servomechanisms. U.S. Pat. No. 5,406,541 reduces the effect of cross-talk in optical heads by implementing an orthogonality condition between the focus and tracking sensors, it does so by using separate optical paths for generating the focus and tracking signals. The need for additional components to create and process separate optical paths adversely affects the cost and complexity of the optical head.

If the vertical separation between the detector and the grating beam splitter is incorrect the diffracted components of an in focus and on track return beam will not be brought to focus in the plane of the detector assembly. In order to optimize the focus error, tracking error and data signals in an LDGU it is therefore important to precisely position the component parts of the LDGU.

SUMMARY OF THE INVENTION

It is an object of the present invention to provide a mechanical assembly which precisely positions the component parts of an LDGU and reduces the difficulty of the assembly and minimizes the above noted problems.

It is a further object of the present invention to provide an LDGU that is well-suited for use in optical recording applications and that exhibits reduced sensitivity to changes in the wavelength of the laser and in the ambient temperature.

It is a still further objective to reduce optical cross-talk without requiring additional optical components.

These objectives are achieved by an optical system including an LDGU having a grating beam splitter and an optical source with an effective aperture for generating a radiation beam to be applied to a data track of an optical storage medium, a detector array and a micro-lens, LDGU mounting means comprising:

a) a baseplate having a plurality of clearance holes and defining a registration groove;

b) a plurality of contact pins which are aligned in the clearance holes of the baseplate;

c) a pedestal defining a plurality of surfaces for mounting the optical source, the detector array and the micro-lens;

d) a cover including a transparent window fixedly secured to the baseplate to form a hermetic seal; and e) a grating support barrel for mounting the grating beam splitter which is aligned to the registration groove in the baseplate and which has an opening and a plurality of registration surfaces defined on its uppermost surface.

Advantages

The present invention provides the following advantages:

i) precise alignment of the detector array with respect to the optical source;

ii) an LDGU which is less sensitive to changes in temperature;

iii) a cover which provides a sealed and therefore stable environment for the optical source, the detector array and the micro-lens;

iv) the assembly comprising the baseplate, contact pins, pedestal, optical source, detector array, micro-lens and cover is supplied as a fully tested sub-assembly;

v) the grating support barrel which supports and aligns the grating element and maintains a fixed separation between the grating element and the detector array; and vi) the registration groove in the baseplate serves to align the grating support barrel and constrains the alignment of the grating element with respect to the optical source and the detector array.

BRIEF DESCRIPTION OF THE DRAWINGS

FIG. 1 shows a cross sectional view of the LDGU and the optical system;

FIG. 3 shows the elements of the grating beam splitter; and

FIG. 4 shows a detector array that can be used in the LDGU of FIG. 1.

DETAILED DESCRIPTION OF THE PREFERRED EMBODIMENTS

Figure 2:
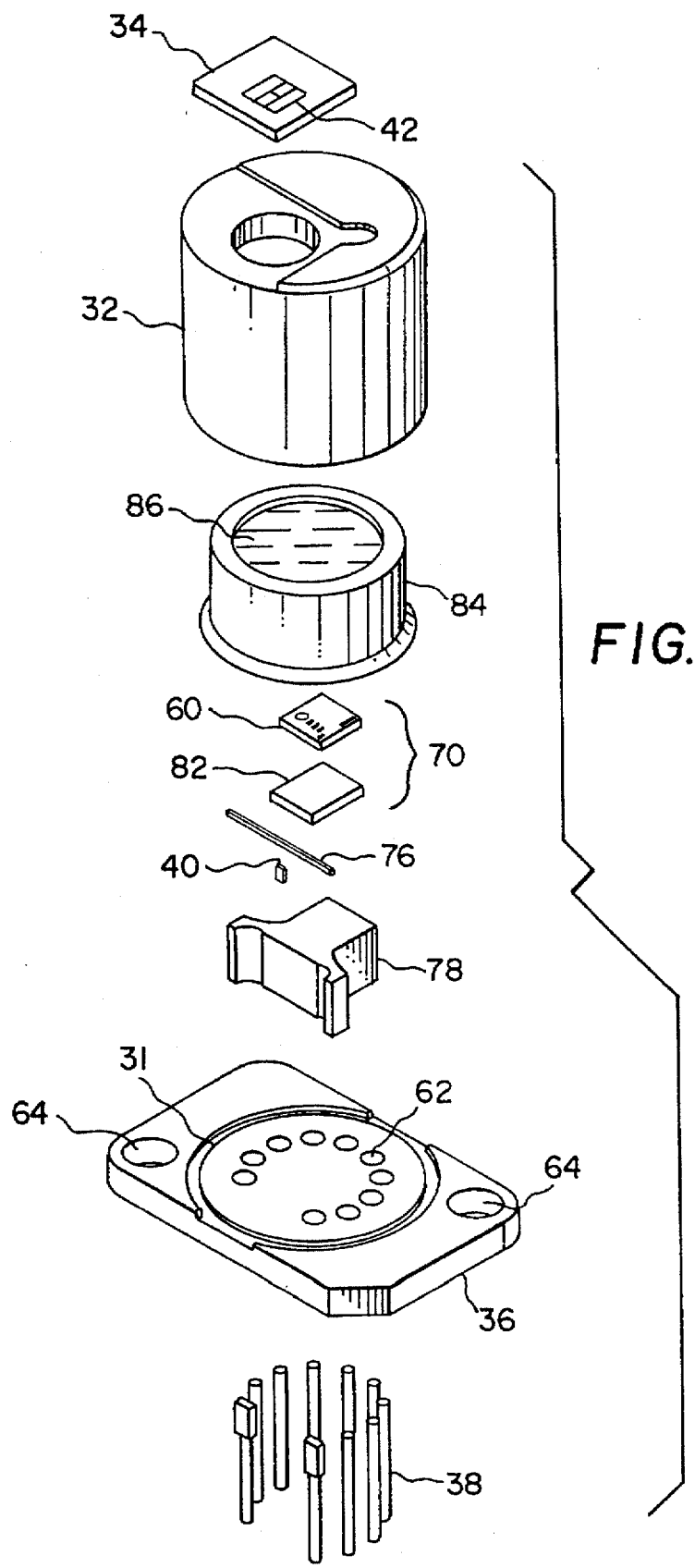
FIG. 2 shows an exploded view of the LDGU.

In commonly-assigned U.S. patent application Ser. No. 08/693,033 alignment of the component parts of the LDGU was achieved using a machined ceramic header and a custom designed body. In addition, a structure for adjusting the vertical separation between the grating element and the detector array was provided. Although the provision of this adjustment permits the focus error and tracking error signals to be optimized, it complicates the design and necessitates a time consuming alignment procedure. Another drawback of this design is that the optical source and the detector array are separate sub-assemblies. Thus there is potential for increased thermal sensitivity because of differences between the coefficients of thermal expansion for the two sub-assemblies.

FIG. 1 shows an exemplary optical system 20 in accordance with the present invention. The components of optical system 20 which process, direct and detect the return beam to provide the FES and TES, and in some cases a data signal, may be collectively referred to as a focus and tracking sensor system. Furthermore, although the present invention is particularly well-suited for use in optical read/write heads, it may also provide advantages in other optical applications, including, for example, position sensors.

The optical system 20 includes an LDGU 30 which may be used in an optical read/write head to both read from and write to optical storage media such as recordable CDs. The LDGU 30 includes an optical source 40, a detector array 60, a micro-lens 76 and a transparent substrate 34. All of which are combined into a single package. The transparent substrate 34 is mounted on the grating support barrel 32 which is fixed to the baseplate 36. The transparent substrate 34 may be glass, plastic, or other transparent material. The pedestal 78 provides surfaces for mounting the optical source 40, the detector array 60 and the micro-lens 76. The optical source 40, which is typically a semiconductor laser diode, generates a radiation beam which is incident on a grating beam splitter 42 formed on an inner surface 43 of the transparent substrate 34. The optical source 40 includes an effective aperture which is well known to those skilled in the art and can be considered to be a point source. The grating beam splitter 42 is preferably a blazed grating beam splitter. The baseplate 36 has a registration groove 31 which is used to align the grating beam splitter 42 to the optical source 40. A number of contact pins 38 protrude from the baseplate 36 for connecting the LDGU 30 to external electronic circuitry (not shown). A cover 84 with a transparent window 86 is provided to encapsulate the optical source 40, the detector array 60 and the micro-lens 76.

The transparent substrate 34 is arranged between the optical source 40 and an optical storage medium 56 such that the radiation beam passes through the substrate. A zeroth order diffraction component of the radiation beam passes undetected through the transparent substrate 34 and the grating beam splitter 42 formed thereon and is collimated by collimating lens 44. The radiation beam is then focused by an objective lens 52 onto an optical storage medium 56, which may be, for example, a recordable CD. Only a portion of the optical storage medium 56 is shown in FIG. 1. The radiation beam is used to store and retrieve information from the optical storage medium.

Any of a number of well known techniques may be used to form the blazed grating beam splitter 42 on the transparent substrate 34. For example, appropriate grating patterns could be photolithographically formed in a layer of photoresist on a surface of transparent substrate 34, an ion milling beam could be used to mill the grating patterns onto the transparent substrate 34, or the grating patterns could be formed using molded clear epoxy or resins. In addition, the grating beam splitter could be formed using holographic techniques, in which, for example, two or more laser beams are used to create an interference pattern in a thin layer of photoresist. These and other grating formation techniques are well known in the art and will not be further described herein. Furthermore, although the grating beam splitter 42 is shown in LDGU 30 on an inner surface of transparent substrate 34, it could also be formed on an outer surface of the substrate, or partially formed on both inner and outer surfaces of the substrate. It may be preferable in many applications, however, to form the grating beam splitter 42 on an inner surface in order to protect it from contaminants.

The optical storage medium 56 includes an optical storage medium surface 56A having a number of data tracks formed thereon. Each data track 56B is shown in cross-section and generally extends in a direction perpendicular to the plane of the drawing. The data track 56B is a type of diffraction component-generating structure. The structure diffracts the incident radiation beam because the depth of the structure is generally a fraction of the wavelength of the incident radiation beam and introduces phase differences in the return beam. Although the data track 56B is shown as a raised structure in the exemplary optical system 20 of FIG. 1, a data track in accordance with the present invention may also be, for example, a groove in the storage medium, a region between two grooves in the optical storage medium 56, a series of unconnected raised regions, or other optical path structures of appropriate dimension and refractive index such that diffraction patterns are created in response to an incident radiation beam.

It should be noted that although the data tracks are generally arranged in a spiral configuration on an optical storage medium such as a recordable CD, a given portion of the data track 56B around a point currently illuminated by the incident radiation beam will exhibit little curvature and therefore such a portion may be considered substantially straight. A projection of such a portion of data track 56B on the grating beam splitter 42 will generally lie in a plane separating part of the grating beam splitter 42 into first and second grating elements. A dashed line 58 is drawn in FIG. 1 between a currently illuminated data track 56B and the center of the optical source 40. The line 58 represents an optical axis of the incident radiation beam and is perpendicular to the data track 56B and the projection thereof onto the grating beam splitter 42.

The data track 56B reflects and diffracts the incident radiation beam applied thereto. The reflected and diffracted incident radiation beam will be referred to herein as a return beam. The return beam is then incident on the grating beam splitter 42, which separates the return beam by principles of diffraction into a number of different portions. These portions are directed towards a detector array 60. The detector array 60 detects the various portions of the return beam and generates signals which, when combined in the manner described below, provide a TES, an FES and a data signal.

FIG. 2 shows an exploded view of the LDGU 30. The baseplate 36 is provided to support the components and to act as a heatsink for the optical source 40. There are a plurality of clearance holes 62 provided for the contact pins 38 and at least two additional clearance holes 64 which are used to align and attach the LDGU 30 to the optical system 20. The contact pins 38 are manufactured by Mill-Max Inc. of Oyster Bay N.Y. and are plated with nickel and gold. The baseplate has a registration groove 31 which is used to locate the grating support barrel 32. The width of the registration groove 31 and the thickness of the grating support barrel 32 together determine the distance over which the grating support barrel 32 can be displaced relative to the optical axis 58. The baseplate 32 is preferably made from Kovar as this permits the contact pins 38 to be attached to the baseplate 32 using borosilicate glass seals. Glass to metal seals are preferred because unlike epoxy the glass will not outgas. This technology is well known in the art and is described, for example, by C. J. Leedecke et al in Electronics Materials Handbook, Vol. 1, Packaging. Alternatively the baseplate can be made from other materials with a high thermal conductivity such as oxygen free hard copper. If the baseplate 32 is made from copper it is coated with a layer of electroplated gold over a layer of electroplated nickel. The contact pins 38 are then fixed in place using a low outgassing epoxy such as the H61 epoxy manufactured by Epoxy Technology Inc of Billerica, Mass.

Typically the pedestal 78 is made from oxygen free hard copper (OFHC) and is coated with electroplated gold on top of electroplated nickel. The pedestal 78 is mounted on the baseplate 32 using solder. In an alternative embodiment the baseplate 32 and the pedestal 78 are machined from a single piece of OFHC and finished with electroplated layers of gold over nickel. The pedestal 78 is designed to support the optical source 40, the detector array 60 and the micro-lens 76. In the preferred embodiment the optical source is attached to the pedestal using an indium based solder alloy. Indium based solders are used extensively in the art. A range of different melting point indium based solder alloys are available, for example, from the Indium Corporation of America of Utica N.Y.

The optical source 40 typically requires two electrical connections. In the preferred embodiment, the first contact is made by means of a wire bond formed between the optical source 40 and one of the contact pins 38. The second electrical contact is made through the solder joint between the optical source 40 the pedestal 78. Alternatively, the optical source 40 can be isolated from the pedestal 78 with a non-conducting submount (not shown), made, for example, from diamond. In this embodiment the second electrical contact is made by means of a wire bond formed between a conductive coating on the surface of the submount and a second contact pin 38.

The astigmatism and ellipticity of the optical source 40 is corrected using the micro-lens 76. The micro-lens 76 is manufactured by Blue Sky Research of Santa Cruz Calif. and is mounted on the pedestal 78 using either solder or epoxy. The position of the micro-lens 76 is adjusted repeatedly until the shape of the beam emitted from the optical source 40 is optimized and the optical aberrations are minimized. The micro-lens 76 is then fixed in place using either a UV curable epoxy or a solder with a melting point lower than that used to bond the optical source 40 to the pedestal 76.

The detector sub-assembly 70 is supplied by UDT of Hawthorne California and comprises a ceramic sub-mount 82 and the detector array 60. FIG. 3 shows the exemplary detector array 60 in greater detail. The detector array 60 includes four detectors a, b, c and d,d', for detecting the first, second, third and fourth portions of the return beam, respectively. The fourth detector is a dual element detector with detector elements d and d'. In other embodiments, the third detector c may be a dual element detector rather than a single element detector. Each detector element may be, for example, a photodiode, a group of photodiodes, or another type of photodetector. Exemplary focus spots 93, 94, 96 and 98 indicate an area of each detector on which the first, second, third and fourth return beam portions, respectively, may be focused when the incident radiation beam is on-track and in-focus relative to the optical storage medium. It should be emphasized that this particular arrangement of detectors is exemplary only. For example, the detectors shown may include additional detector elements or fewer detector elements in other embodiments of the present invention. In addition, each of the detectors need not be part of a single detector array. As will be discussed in greater detail below, the grating elements and corresponding detector elements are arranged such that the optical cross-talk between tracking and focus signals is minimized.

In addition to the detector elements the surface of the detector array 60 has two sets of alignment marks 66a and 66b. The locations of the alignment marks are defined precisely by photolithography. If orthogonal lines were to be drawn between the centers of the alignment marks 66a and 66b, they would intersect the centre of the dual element detector dd'. These alignment marks are used to ensure that the detector sub-assembly 70 (See FIG. 2) is placed in the correct position on the top surface of the pedestal 78. In order to align the detector sub-assembly 70 with respect to the optical source 40, the detector sub-assembly is supported using a vacuum tool which is mounted on a three axis micro-manipulator.

The pedestal 78 and the detector sub-assembly are imaged onto a CCD camera and viewed on a TV monitor. The optical source 40 is switched on and the point of emission from the optical source 40 is used to define a reference position on the TV monitor. A video caliper, such as the Olympus Corporation Cue Micro 300 manufactured by the Mercer Scientific International Corporation of Trenton, N.J., is used to superimpose a reference line over the image of the optical source 40. A second reference line is then moved to the plane corresponding to the correct position for the detector sub-assembly 70. The micro-manipulators are then adjusted until the alignment marks 66b on the detector array 60 are aligned with the second reference line. A similar procedure is adopted to correctly align the detector sub-assembly 70 in the orthogonal transverse direction. Once the detector sub-assembly is correctly positioned it is fixed in place using either an epoxy or a low melting point solder.

To guarantee the long term reliability of the optical source 40 it is necessary to provide a stable operating environment. This is accomplished by fixing a cover 84 over the optical source 40, the detector array 60 and the micro-lens 76. The cover 84 has a transparent window 86 and is welded to the baseplate 36. The reliability of the optical source 40 is then predicted running it continuously at constant power for a period of several hundred hours.

The grating support barrel 32 is typically made from anodized aluminum and has a plurality of registration surfaces defined on its uppermost surface. The transparent substrate 34 is pushed up against the registration surfaces and is then fixed in place with epoxy. The height of the grating support barrel 32 defines a fixed separation between the grating beam splitter 42 and the optical source 40. The grating support barrel 32 is designed to fit into the registration groove 31 on the baseplate 36. The thickness of the walls of the grating support barrel 32 and the width of the registration groove 31 are such that a limited degree of adjustment is available to align the grating bean splitter 42 to the optical source 40. This alignment is made with the LDGU 30 secured to the optical system 20. Transverse and rotational adjustments are made to the position of the grating support barrel 32 until the focus error and tracking error signals are found to be optimized. The grating support barrel is then fixed in place using a UV curable epoxy.

FIG. 4 shows a detailed view, in a plane parallel to the plane of the baseplate 36, of an exemplary blazed grating beam splitter 42 in accordance with the present invention. The exemplary blazed grating beam splitter 42 includes first, second, third and fourth grating elements A, B, C and D, respectively. In a preferred embodiment of the present invention, the grating elements A, B, C and D of the grating beam splitter 42 are blazed gratings. Blazed gratings are commonly used in optical systems and their operation and high efficiency properties are generally well known. In alternative embodiments, other types of gratings could be used, including, for example, sinusoidal gratings, ruled gratings and holographic structures. Each grating element includes a grating pattern as shown in FIG. 4. The line spacings, line widths, blaze angles, and other dimensions of the grating patterns in each grating element may vary depending upon the application, and can be readily determined in a well known manner.

The first and second grating elements A and B of FIG. 4 are divided along a line 102 which is parallel to the above-described tangent to the data track 56B. The line 102 is also substantially parallel to a projection 103 of the tangent to the data track 56B onto the grating beam splitter 42, and lies in the reference plane defined by the optical axis 58 and the tangent to the data track 56B. The third and fourth grating elements C and D are arranged adjacent to and on opposite sides of the first and second grating elements A and B. The elements C and D are separated from elements A and B by lines 104 and 106, respectively, which are perpendicular to the data track 56B or the projection 103 of the data track 56B on the grating beam splitter 42. The grating elements A, B, C and D separate the return beam into four different portions, along planes which contain the lines 102, 104 and 106. The first and second grating elements A and B separate the return beam along the reference plane defined above. In other embodiments, the first and second grating elements could separate the return beam along another plane substantially parallel to the reference plane, or along two different planes substantially parallel to the reference plane. The third and fourth grating elements C and D separate the return beam along planes substantially perpendicular to the reference plane. In this exemplary embodiment, each of the resulting portions of the return beam is focused on a different detector in detector array 60.

In the exemplary embodiment of FIG. 4, the grating patterns shown are suitable for directing the first, second, third and fourth separated portions of the return beam onto detectors a, b, c and d, d', respectively, of detector array 60. It should be noted that the arrangement of grating elements shown in FIG. 4 is exemplary only and alternative embodiments of the present invention may utilize other arrangements. For example, the various elements of the grating beam splitter 42 may be separated by lines which deviate from the parallel or perpendicular lines shown in FIG. 4 by up to about ten percent. The terms "substantially parallel" and "substantially perpendicular," as used herein, include deviations of at least ten percent from parallel and perpendicular, respectively. Although the amount of optical cross-talk may increase as a result of such deviations, an improvement over most current prior art systems would generally still be obtained. In addition, although a four element grating beam splitter may be preferred in many applications, the grating beam splitter could include more or less than four grating elements. For example, an embodiment which does not require a data signal may include only the three grating elements A, B and C, or A, B and D.

In general, the return beam includes a reflected component, also referred to as a zeroth order diffraction component, and a number of higher order diffraction components diffracted by the surface of the optical storage medium. A given diffraction order generally includes both a positive and a negative diffraction component. Although higher order diffraction components may also be present in the return beam, the present invention can be readily understood without further consideration of diffraction components greater than first order. When the reflected component overlaps with the first order diffracted components, interference occurs. This interference may be directed to detectors a and b to provide, for example, a push-pull tracking error signal, as will be described below. The two first order diffraction components may be, for example, contiguous with an optical axis of the incident radiation beam, and therefore both may overlap with the reflected component. It should be noted, however, that the present invention may be utilized in systems in which the positive and negative diffraction components overlap with each other as well as with the reflected components. Additional detail regarding diffraction components may be found in, for example, the above-cited U.S. patent application Ser. No. 07/998,179, now U.S. Pat. No. 5,406,541, which issued on Apr. 11, 1995 and pp. 172–179 of A. Marchant, "Optical Recording: A Technical Overview," Addison-Wesley, Reading, Mass., which are incorporated by reference herein.

A tracking error signal (TES) may be generated from the first and second portions of the return beam incident on the first and second detectors a and b, respectively, of the detector array 60. The TES is generated in accordance with the relationship a-b, which indicates that the signal generated by detector element b is subtracted from the signal generated by detector element a. As a result of passing through the above-described grating beam splitter 42, the first and second portions of the return beam each may include a different diffraction component of a given diffraction order, diffracted from the optical storage medium, as well as undiffracted components. The different diffraction component may be either a positive or a negative diffraction component. It should be understood that, in general, only part of any given diffraction component, rather than the entire component, falls within the objective lens aperture and will therefore be incident on grating beam splitter 42. References made herein to a particular diffraction component are thus meant to include any part of that component.

A focus error signal (FES) may be generated from the fourth portion of the return beam incident on the fourth detector d, d' of the detector array 60. A FES is generated in accordance with the relationship d–d', which indicates that the signal generated by detector element d' is subtracted from the signal generated by detector element d. As a result of passing through the above-described grating beam splitter 42, the third and fourth portions of the return beam include both positive and negative diffraction components of a given diffraction order, diffracted from the optical storage medium, as well as undiffracted components. Each of the detector elements d and d' thus receive both diffraction components of a given diffraction order. By subtracting the signals resulting from detection of the fourth portion of the return beam on detector elements d and d', the diffraction components of a given diffraction order substantially cancel out, thereby reducing optical cross-talk.

A data signal, indicative of the data stored on data track 56B, may also be generated in the optical system 20. For example, a data signal could be generated by combining the signals generated by each detector element in the detector array 60, in accordance with the relationship a+b+c+d+d'. Alternatively, signals from a subset of detector elements could be combined to generate a data signal.

Optical system 20 may also include electronic circuitry (not shown) for combining signals generated by the detector elements of detector array 60. The electronic circuitry may include adders, subtracters or other types of signal combiners for generating focus error, tracking error and data signals in accordance with the above-described relationships. Such electronic circuitry is generally well known in the art and will therefore not be further described herein.

In general, the orientation and location of the detector elements a and b is not critical to the operation of the present invention, and the arrangement in FIG. 3 or other alternative arrangements may be chosen in order to satisfy detector array packaging constraints or other criteria. The position of the fourth detector elements d and d' may also be varied but the division between the pair should generally be along a line substantially perpendicular to the data track 56B, or the projection 103 of the data track 56B on the grating beam splitter 42. This division line is also substantially perpendicular to the above-defined reference plane.

The grating beam splitter 42 of the present invention may be replaced with other optical devices capable of dividing the return beam reflected and diffracted from a data track into a number of distinct portions in accordance with the above description. Alternatives to the grating beam splitter 42 include, for example, holograms. In addition, as mentioned above, the grating or other optical device used to separate the return beam into its respective portions may include more or less than four elements. The elements could be suitably arranged to separate the return beam into portions which, when detected, generate signals which may be combined in accordance with the present invention such that optical cross-talk is minimized.

Although the foregoing detailed description has illustrated the present invention primarily in terms of a particular optical information storage and retrieval system, it should be understood that the embodiments described are exemplary only. Many variations may be made in the arrangements shown, including, for example, the type of grating beam splitter used to separate the return beam and the arrangement, shape and number of grating elements, the number of portions into which the return beam is separated, the arrangement of detectors and detector elements onto which the portions of the return beam are focused, and the type and arrangement of optical components for directing the incident and return radiation beams in the optical system. These and other alternatives and variations will be readily apparent to those skilled in the art, and the present invention is therefore limited only by the appended claims.

The invention has been described in detail with particular reference to certain preferred embodiments thereof, but it will be understood that variations and modifications can be effected within the spirit and scope of the invention.

PARTS LIST

A,B,C,D grating elements
a,b,c,d,d' detectors
20 optical system
30 laser-detector-grating unit (LDGU)
31 registration groove
32 grating support barrel
34 transparent substrate
36 baseplate
38 contact pins
40 optical source
42 grating beam splitter
43 inner surface
44 collimating lens
52 objective lens
56 optical storage medium
56A optical storage medium surface
56B data track
58 optical axis (dashed line)
60 detector array
62 clearance holes
64 clearance holes
66a alignment marks
66b alignment marks PARTS LIST (con't)
70 detector sub-assembly
76 micro-lens
78 pedestal
82 ceramic sub-mount
84 cover
86 transparent window
93,94,96,98 focus spots
102 line
103 projection
104,106 lines

We claim:

1. In an optical system including an LDGU having a grating beam splitter and an optical source with an effective aperture for generating a radiation beam to be applied to a data track of an optical storage medium, a detector array and a micro-lens, LDGU(Laser-Detector-Grating Unit) mounting means comprising:

a) a baseplate having a plurality of clearance holes and defining a registration groove;

b) a plurality of contact pins which are aligned in the clearance holes of the baseplate;

c) a pedestal defining a plurality of surfaces for mounting the optical source, the detector array and the microlens;

d) a cover including a transparent window fixedly secured to the baseplate to form a hermetic seal; and e) a grating support barrel for mounting the grating beam splitter which is aligned to the registration groove in the baseplate and which has an opening and a plurality of registration surfaces defined on its uppermost surface.

2. The invention of claim 1 further including fastening means which secure through selected ones of the clearance holes the LDGU to the optical system.

* * * * *